FIP8102 XR 2,908,892
TK5355Y
X5229E
X5203D
SEARCH ROOM
Oct. 13, 1959 W. C. LANNING 2,908,892
PRIVATE LINE RECEIVER
Original Filed Sept. 3, 1953
SUBSTITUTE FOR MISSING XR
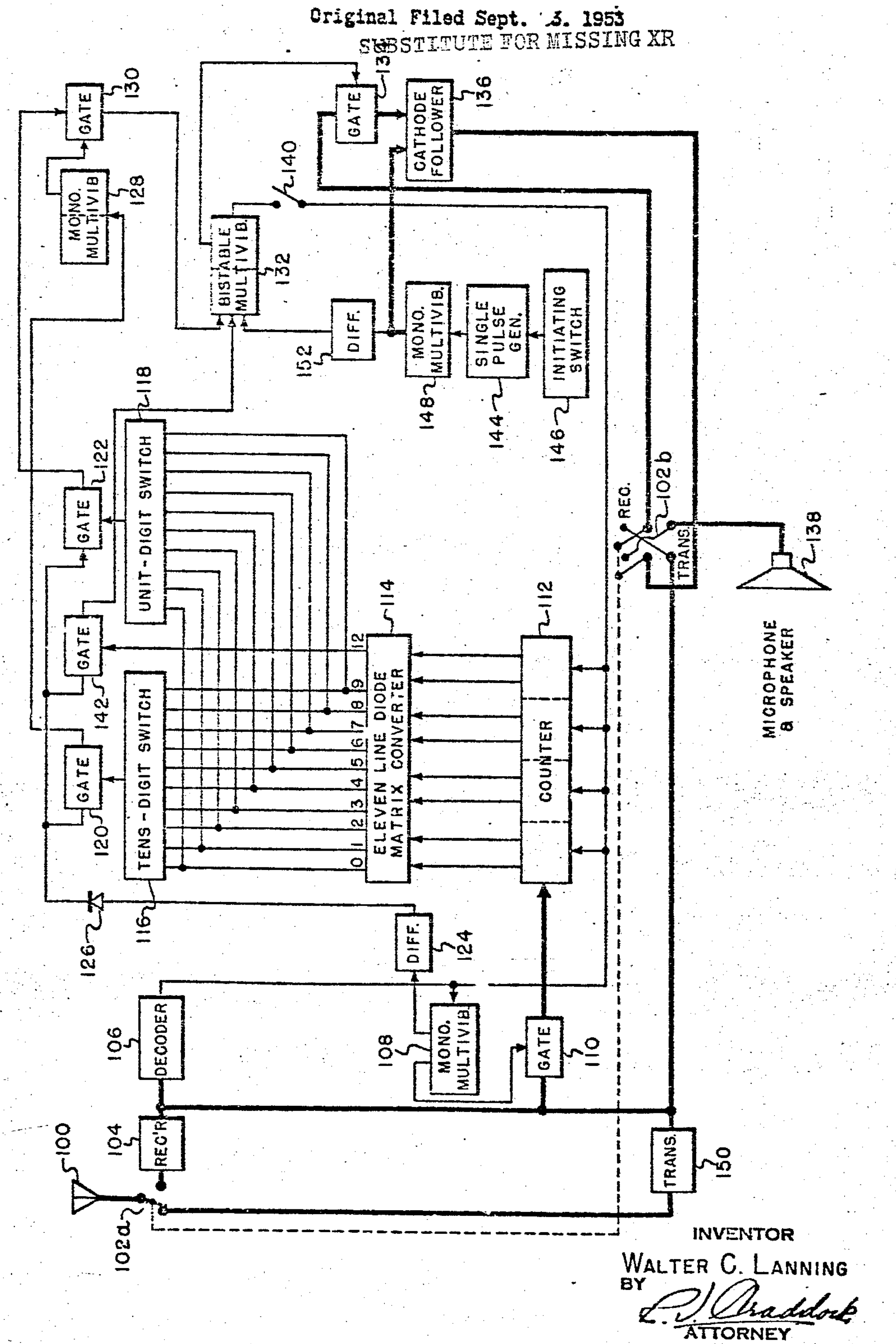
INVENTOR
WALTER C. LANNING
BY L. J. Craddock
ATTORNEY
2908892
OR IN 340/168R 2,908,892

PRIVATE LINE RECEIVER

Walter C. Lanning, Plainview, N.Y., assignor to Sperry Rand Corporation, a corporation of Delaware Original application September 23, 1953, Serial No. 381,840, now Patent No. 2,810,122, dated October 15, 1957. Divided and this application December 6, 1956, Serial No. 626,690

6 Claims. (Cl. 340—168)

The present application is a division of patent application Serial No. 381,840, filed on September 23, 1953, in the name of Walter C. Lanning, and assigned to the present assignee, now Patent 2,810,122.

This invention relates to private line communication systems, and more particularly, is concerned with an improved receiver for use in such systems, which receiver is selectively responsive to one or more predetermined groups of pulsed transmissions, each group comprising one long pulse followed by one or more short pulses.

Radio intercommunication systems are well known in the art in which a number of receiving stations are in communication with a master station, such as in the police call systems or the taxicab call systems. In general these systems provide for a voice signal to be transmitted by the master station which is received by all of the substations. It is necessary for the operator at the substation to listen to all the messages and to single out therefrom those messages which are directed to him. This constitutes a disadvantage in the intercommunication system because the substation operators are constantly exposed to a continuous garble of messages from which the substation operator must be alert to single out those messages important to the one substation in particular.

It has therefore been recognized that an improved intercommunication system should provide means by which only those messages directly concerning a particular substation would be received by that substation. Several systems heretofore have been proposed in the prior art for accomplishing this result. One such method employs a number of different carrier frequencies with each of the substations tuned to a different frequency. Thus only messages carried on a particular carrier frequency are received by a particular substation. The objections to such a system, however, are that the number of substations is limited by the band width of the transmitter, in relation to the frequency band assignable to the service, and the carrier frequencies must be held to very close tolerances, generally requiring separate crystal control for each substation.

Another solution heretofore proposed is the use of a common carrier frequency for all the substations but impressing an identifying tone differing in frenquency for each of the substations. Again, to use such a system with a large number of substations results in closely spaced tone signals to limit the modulation side bands. Thus close tolerances are required in establishing the modulation frequencies, resulting in a complicated and expensive system as the number of substations is increased.

Still other solutions are described in Patent 2,812,509, issued on November 5, 1957 in the name of Richard Phelps, and in the aforementioned Patent 2,810,122, in which an identifying pulse code is sent out prior to the transmission of the voice message, the pulse code being received by all the substations with only that substation which is acuated by the code message being gated to receive the voice message following.

It is the general object of the present invention to provide an improved electronic private line communication receiver which is compact, efficient, and reliable.

A more specific object is to provide a private line communication receiver selectively responsive to a predetermined but adjustable identifying pulse code which is transmitted prior to the message portion of a communication.

Another object is to provide a receiver for a private line system which is selectively responsive to both a fixed and adjustable predetermined identifying pulse code.

A further object is to provide a communication receiver which is responsive to the presence of a transmitted pulse modulated carrier signal comprising a long pulse and a predetermined number of short pulses transmitted in time sequence.

An additional object is to provide a private line communication receiver which is adaptable to an arbitrary extension of the number of identifying pulse codes without the duplication of decoding apparatus.

The foregoing and other objects of the present invention, as will appear as the specification proceeds, are basically achieved by the provision of a receiver adapted to selectively respond to a predetermined identifying pulse code transmitted prior in time to the message portion of a communication. The pulse code is comprised of one or more groups of pulsed transmissions, each group corresponding to a respective digit of a decimal number and consisting of a longer pulse followed by a predetermined number of shorter pulses.

The demodulated output of the receiver is coupled to a gate and to a pulse length discriminator, hereinafter termed a decoder. The decoder produces an output pulse whenever a long pulse is received, the output pulse opening the gate for a period of time sufficient to permit the following group of received short pulses to pass to a counter which has been preset by the output pulse from the decoder. A diode matrix circuit, adapted to receive parallel outputs from respective stages comprising the counter, energizes one of ten output leads in response to the condition of the counter following the train of short pulses from the receiver.

In an illustrative embodiment of the present invention, adapted to receive two groups of pulsed transmissions, a ten-position switch is included, which, if set to a position corresponding to the number of received short pulses contained in the first of said groups of pulsed transmissions, connects the energized lead from the diode matrix circuit through a gate, opened by the decoded long pulse, to a memory circuit.

This process is repeated with the second long pulse and its respective succession of short pulses. A second ten-position switch, if set to the second digit of said decimal number, connects the energized lead from the diode matrix to the memory circuit. For a two-digit code number, the memory circuit provides an output pulse following the two input signals from the diode matrix, the output of the memory circuit opening a second gate which passes the subsequent message signal from the receiver to the phono-output of the substation. The counter circuit in the receiving station responds to pulses up to sixteen so that digits larger than ten can be utilized by providing pulse code groups including up to sixteen short pulses. Those digits over ten can be used to contact all receiving stations by presetting all of the receiving stations to stand by in response to a short pulse group of, for example, twelve pulses.

For a better understanding of the invention reference should be had to the accompanying sole figure, which is a schematic block diagram of an illustrative embodiment of the receiver.

Referring to the sole figure, the signal from the transmitting station (not shown) is picked up by the antenna 100 and connected through a section 102a of a transmit-receive switch to a receiver 104. The demodulated output signal from the receiver 104, which includes a long pulse for each digit of the code number with each long pulse followed by a series of short pulses representative of one of the respective digits of the code number, is connected to a decoder circuit 106. In operation, the decoder 106 produces an output signal in response to the first as well as subsequent long pulses but does not respond to any pulses of shorter duration. The output pulse from the decoder 106 following the first received long pulse triggers a monostable multivibrator 108 that opens the gate 110 for a period as determined by the period of the monostable multivibrator. The recovery time of the multivibrator 108 is such as to hold the gate 110 open for a sufficient period to permit the pasage of a maximum of sixteen short pulses from the receiver 104.

With gate 110 open, the short pulse code group following the initial received long pulse is coupled by the open gate 110 to the triggering input of a counter 112 having four binary stages. The output pulse from the decoder 106 is simultaneously coupled to each of the four stages of the counter 112 to reset the counter to its maximum pulse count condition, namely, the #15 stable state. Thus the first short pulse from the gate 110 returns the counter 112 to its zero condition with subsequent short pulses from the gate 110 causing the counter to count up to the first digit of the code number, since the number of pulses received is always one more than the digit number. In other words, with the first digit $a$ of the code number set at the master station $(a+1)$ pulses are actually transmitted, but the counter 112 counts up to $a$, since the first pulse returns the counter to zero after it is initially reset at the #15 stable condition by the output of the decoder 106.

The binary counter 112 is connected in parallel into an eleven-line diode matrix converter 114. Such diode matrix converters are well known in the art for translating a number from binary to decimal notation. See for example, "High-Speed Computing Devices," by Engineering Research Associates, McGraw-Hill Publishing Company, pages 40 to 43. The diode matrix converter, in addition to translating the binary numbers from zero to nine to decimal notation, further includes another matrix line for converting an emergency call number 12 from binary to decimal notation.

In operation, any particular binary number set up on the counter 112 energizes one of the eleven output lines of the diode matrix converter. For example, where the first digit of the code number is 9, the counter 112, as heretofore explained, stops at the #9 stable condition, which by means of the diode matrix converter 114 results in a positive potential being applied to the #9 output line of the converter.

A pair of ten-position, single pole switches 116 and 118 selectively connect one of the ten lines respectively to the gates 120 and 122. Switch 116 is pre-set to the tens-digit of the code number of the particular substation, while the switch 118 is pre-set to the units-digit of the code number of that substation. If the position of the switch 116 corresponds to the first digit of the code number as sent out by the transmitting station, the particular output line from the diode matrix converter 114 which is energized by the counter 112 is connected by the switch 116 to the gate 120, whereby the gate 120 is opened. When the multivibrator 108 returns to its stable state, a differentiating circuit 124, produces a positive spike which is coupled by means of a diode 126 through the now open gate 120 to the trigger input of a monostable multivibrator 128. The period of the monostable multivibrator 128 is greater than the time between long pulses as sent out by the master station, so that the multivibrator 128, when triggered, holds a gate 130 open while the second digit or group is being received.

The second digit code group of the transmitted code number includes a long pulse which is decoded by the decoder 106 to open the gate 110 in the manner as above described, the successive short pulses being passed by the gate 110 to the counter 112, which has been returned to its #15 stable condition by the output of the decoder 106. The counter 112 is thereby set to the proper binary number corresponding to the units-digit of the decimal code number. This binary code number on the counter 112 is converted by the diode matrix converter 114 so as to energize the corresponding decimal number output line going to the units-digit switch 118.

It should be noted that, although a number of the output lines from the diode matrix may be energized during the time the short pulses are received, these cannot effect the operation since only the line energized following the last short pulse of a group can hold the gates 120 or 122 open at the time a pulse is received from the multivibrator 108. The fact that both digits of the pulse code are the same does not matter, even though both gates 120 and 122 are held open following each short pulse group, since the inherent response delay of multivibrator 128 prevents gate 130 from opening in time to pass the first pulse from the gate 122.

If the switch 118 is set to the proper units-digit corresponding to the code number sent out by the transmitting station, the gate 122 is opened. The second positive pulse resulting from the second return of the multivibrator 108 to its stable condition passes through the open gate 122 and to the open gate 130 (held open by the multivibrator 128) to trigger a bistable multivibrator 132. Multivibrator 132 is reset to a predetermined stable condition by each output pulse from decoder 106 simultaneously with the aforementioned resetting of counter 112. Reversal of said reset condition of the multivibrator 132 by the said second positive pulse from the multivibrator 108 opens a gate 134. With the gate 134 open, the received message for example, voice, following the address code is connected from the receiver 104 through the transmit-receive switch 102b through the gate 134 to a cathode follower 136. The transmit-receive switch in turn connects the output of the cathode follower 136 to a transducer 138 which serves both as a microphone and a speaker.

At the completion of the communication, the transmitting station sends out a long pulse which is decoded by the decoder 106 and connected by a switch 140 to the multivibrator 132, the output of the decoder reversing the stable condition of the multivibrator 132 and closing the gate 134, thereby preventing any further signals from getting through to the speaker 138.

When an emergency message is sent out by the transmitting station, the initial long pulse is detected by the decoder 106, causing the gate 110 to be opened and the subsequent short pulse group to be coupled to the counter 112. Since the number 12 has been selected as the code for emergency calls, 13 short pulses are received which set the counter 112 in the #12 stable condition, in which condition it energizes the output line #12 from the diode matrix converter 114, opening a gate 142. When gate 142 is open, the subsequent positive pulse from the differentiating circuit 124, occurring with the return of the multivibrator 108 to its stable condition, is coupled to the multivibrator 132. Reversal of the multivibrator 132 by the gated pulse from the differentiated output of the multivibrator 108 results in the opening of the gate 134, thus permitting the local message which follows to be connected to the microphone-speaker 138.

It may be desirable for a receiver-substation to contact the master transmitting station. This is accomplished by transmitting a single short pulse which, when received by the master station, acts to put the master station in condition to receive the message. This sharp pulse is provided in the substation by a single pulse generator 144 which is triggered by an initiating switch 146. The output of the single pulse generator 144 triggers a monostable multivibrator 148, the output pulse of which, with the transmit-receive switch 102 in the transmitting position, sends a pulse through the cathode follower 136 and transmit-receive switch 102, to a transmitter 150, the output of which is a modulated carrier signal which is connected by means of the transmit-receive switch 102a to the antenna 100. The output of the multivibrator 148 is simultaneously differentiated by differentiating circuit 152 and coupled to the multivibrator 132 for opening the gate 134 to permit reception of any subsequent messages from the master station.

The switch 140 permits the substation to listen to all messages sent out by the master station regardless of the particular decimal code number transmitted, since when the switch 140 is left open, the gate 134 will remain open, no pulse from the decoder 106 being connected to the multivibrator 132 to close the gate 134.

The operation of the private line system of the present invention is apparent from the above description. The circuits represented by the block diagram of the sole figure are conventional and well known in the art. Multivibrators, both monostable and bistable, gate circuits, differentiating circuits, transmitters and receivers are well-known and are used in a conventional manner in the present invention. The counters 38 and 112 are of a conventional type including four cascaded bistable multivibrator or binary stages, each of which produces one output pulse for each two input pulses applied thereto. Such counters are described in detail in "Waveforms," vol. 21, MIT Radiation Laboratory Series, McGraw-Hill Publishing Co., p. 605. The decoder 106 used in the substation may be any one of a number of such circuits described in the prior art for recognizing a pulse having a particular time duration.

From the above description of the private line system receiver, it will be seen that the various objects of the invention have been achieved by providing a receiver for a radio intercommunication system whereby reception of a vocal or other message communication is possible only when the code number previously assigned to a particular substation is identical with the code number transmitted by the master station. The master station can thus carry on a vocal communication with any one of a hundred substations without bothering any of the other stations. The system further provides that the master station can simulaneously communicate with all the substations by sending out an emergency code number which opens up all the substations for reception. While the number of substations in the system may be extended to 100, it will be seen that the system is readily adaptable to provide for ten times this number, or even more, by providing for additional code groups representing additional digits to be sent by the master station.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a private line communication system, receiving apparatus responsive to at least one transmitted group of pulse modulated signals, each group comprising a longer pulse followed by a predetermined number of shorter pulses, said receiving apparatus comprising a receiver having a demodulation output, pulse length discriminating means for producing an output in response to the longer pulses only, adjustable timing means including a sequence counter for producing an output signal only from a predetermined number of received shorter pulses, first gating means triggered open by the output of the pulse width discriminating means for connecting the output of the receiver to the adjustable timing means, second gating means connected to the output of the timing means, time delay means coupling the output of the pulse width discriminating means to the second gating means for triggering open the second gating means, the output of the time delay means triggering closed the first gating means, message responsive means coupled to the output of the receiver, and means responsive to the output of the second gating means for actuating said message responsive means whereby subsequent received signals are reproduced by the message responsive means.

2. In a private line communication system, receiving apparatus responsive to at least one transmitted group of pulse modulated signals, each group comprising a long pulse and a predetermined number of short pulses, said receiving apparatus including a receiver having a demodulation output, a long pulse decoder coupled to the output of the receiver for producing an output pulse in response to a received long pulse from a transmitting station, a pulse counter, gating means coupling the output of the receiver to the counter, the gating means being triggered conductive for a predetermined time interval by the output of the long pulse decoder and the counter being preset to an initial condition by the output of the decoder, a diode matrix converter connected across the counter for energizing one of a plurality of output lines in response to the condition of the counter following a group of said short input pulses from the receiver, a time delay circuit coupled to the output of the decoder, gating means coupled to at least one of said output lines of the diode matrix converter, the output of the delay circuit being coupled to said last-named gating means, said last-named gating means producing an output pulse in response to a pulse from said delay circuit depending on the output from the diode matrix converter after receiving the long and short pulses from the transmitting station, and message responsive means coupled to the output of the receiver, said means being triggered on by the output of said last-named gating means.

3. In a private line communication system, means for identifying a signal directed to a particular receiving station from a sending station where the signal includes at least two pulse code groups with each group including a long pulse followed by a predetermined number of short pulses, said means including a receiver having a demodulation output, means for counting the number of received short pulses following a received long pulse, first means responsive to the condition of said counting means after a first predetermined number of received short pulses, second means responsive to the condition of the counting means after a second predetermined number of received short pulses, and message responsive means, said first and second means cooperating when actuated successively by received groups of short pulses to couple the output of the receiver to said message responsive means.

4. In a private line communication system, receiving apparatus responsive to two groups of pulse modulated signals, each group comprising a long pulse and a predetermined number of short pulses, said receiving apparatus including counting means responsive to said short pulses, said counting means being reset to an initial condition by said long pulses, first means for producing a first output signal in response to the condition of said counter means corresponding to a first predetermined number of short pulses applied to the counter means, second means for producing a second output signal in response to the condition of said counting means corresponding to a second predetermined number of short pulses applied to the counting means, and means for producing an output signal in response to said first and second output signals for indicating a match between the number of short pulses from a sending station and the predetermined numbers of short pulses established by said first and second means associated with the counting means.

5. In a private line communication system, means for identifying a signal directed to a particular receiving station from a sending station where the signal includes at least two pulse code groups with each group including a long pulse followed by a predetermined number of short pulses, said means including a receiver having a demodulation output, a long pulse decoder coupled to the output of the receiver for producing an output pulse in response to a received long pulse from the sending station, a pulse counter, gating means coupling the output of the receiver to the counter, the gating means being triggered conductive for a predetermined time interval by the output of the long pulse decoder, and the the counter being pre-set to an initial condition by the output of the decoder, a diode matrix converter connected across the counter for energizing one of a plurality of output lines in response to the condition of the counter following a group of short input pulses from the receiver, a time delay circuit coupled to the output of the decoder, a first gate, a second gate, first switching means for selectively connecting any one of said output lines from the converter to the first gate, second switching means for selectively connecting any one of said output lines from the converter to the second gate, the output of the delay circuit being connected to the inputs of the first and second gates, a third gate triggered conductive by the output of the first gate, the output of the second gate being coupled to the input of the third gate, whereby the second delay pulse from the delay circuit is passed to the output of the third gate, and message responsive means coupled to the output of the receiver, said means being triggered on by the output of said third gate.

6. In a private line communication system, receiving apparatus responsive to at least two transmitted groups of pulse modulated signals, each group comprising a long pulse followed by a predetermined number of short pulses, said receiving apparatus comprising a receiver having a demodulation output, a long pulse decoder coupled to the output of the receiver for producing an output pulse in response to a received long pulse from a transmitting station, a pulse counter, gating means coupling the output of the receiver to the counter, the gating means being triggered conductive for a predetermined time interval by the output of the long pulse decoder and the counter being preset to an initial condition by the output of the decoder, a diode matrix converter connected across the counter for energizing one of a plurality of output lines in response to the condition of the counter following a group of received short input pulses from the receiver, a time delay circuit coupled to the output of the decoder, a first gate, a second gate, means for connecting one of said output lines from the converter to the first gate, means for connecting one of said output lines from the converter to the second gate, the output of the delay circuit being connected to the inputs of the first and second gates, a third gate triggered conductive by the output of the first gate, the output of the second gate being coupled to the input of the third gate whereby the second delay pulse from the delay circuit is passed to the output of the third gate and message responsive means coupled to the output of the receiver, said means being triggered on by the output of said third gate.

References Cited in the file of this patent

UNITED STATES PATENTS 2,675,537 Cahill ---------------- Apr. 13, 1954